United States Patent [19]
Catto

[11] 3,976,236
[45] Aug. 24, 1976

[54] REVERSIBLE TAPE DRIVE APPARATUS

[75] Inventor: Kenneth A. Catto, Beaverton, Oreg.

[73] Assignee: Telephonax, Inc., Portland, Oreg.

[22] Filed: Apr. 4, 1975

[21] Appl. No.: 565,104

[52] U.S. Cl. .................................. 226/50; 226/187
[51] Int. Cl.² ...................................... B65H 17/22
[58] Field of Search ............ 226/50, 176, 177, 178, 226/181, 186, 187

[56] References Cited
UNITED STATES PATENTS

| | | | |
|---|---|---|---|
| 2,790,643 | 4/1957 | Gedde | 226/50 X |
| 3,217,996 | 11/1965 | Bernier | 226/50 X |

*Primary Examiner*—Richard A. Schacher
*Attorney, Agent, or Firm*—Kolisch, Hartwell, Dickinson & Stuart

[57] ABSTRACT

Apparatus for selectively driving a magnetic tape, or the like, in reverse directions. The apparatus features a pair of shafts driven simultaneously in a common direction by a shared motor, and a pinch roller for each shaft for pinching thereagainst a stretch of tape extending between the roller and shaft. Shifting mechanism mounts the rollers in such a manner that shifting of one roller to pinch tape against its associated shaft is accompanied by simultaneous shifting of the other roller away from its associated shaft, and vice versa. The shift mechanism also permits the rollers both to be simultaneously shifted away from their respective associated shafts, whereby one or both of these shafts may be used for other operations.

10 Claims, 2 Drawing Figures

REVERSIBLE TAPE DRIVE APPARATUS

BACKGROUND AND SUMMARY OF THE INVENTION

This invention pertains to apparatus for selectively driving a magnetic tape, or the like, in reverse directions. For the purpose of illustration herein, a preferred embodiment, and a modification, of the invention are described in conjunction with a tape deck of the type used in a telephone answering device.

Various types of recording equipment, such as a telephone answering device, utilize a tape deck wherein a length of magnetic recording tape is selectively driven in reverse directions to record, playback and erase various messages. Such equipment is usually placed in use under circumstances where it is unattended, and in this situation, it is, of course, desirable that the equipment exhibit a high degree of performance reliability. Further, equipment, such as telephone answering devices, is beginning to receive relatively wide-spread use, including use in private homes. It is thus further desirable to be able to offer such equipment at a relatively low cost, so that it will be economically available to a large number of users. Hence, it is obviously advantageous to offer a relatively simple and lowcost construction in the mechanism used in the equipment.

A general object of the present invention, therefore, is to provide a unique system, or apparatus, for selectively, reversibly driving a magnetic tape, or the like, which apparatus takes the above considerations into account in a practical and satisfactory manner.

More specifically, an object of the invention is to provide a relatively simple, low-cost, reliable system for reversibly driving such a tape.

According to the invention, what is proposed is a pair of adjacent, but spaced-apart rotary shafts which are driven simultaneously, and in a common direction by a single drive motor. In the embodiments of the invention described below, one of these shafts is the output shaft of the motor itself, and the other is driven by the motor through pulleys and a belt. Provided for each shaft is a pinch roller which is movable into and out of engagement with the shaft for pinching against a stretch of tape extending between it and the shaft. Guide means is also provided for guiding a length of tape between each pinch roller and its associated shaft, with such a length of tape extending on one side of one shaft (considering its direction of rotation) and on the opposite side of the other shaft. The pinch rollers are similarly located on opposite sides of their respective shafts.

The pinch rollers in the apparatus are mounted on carriers which are pivoted on a deck that carries the apparatus, with a biasing spring acting on one of these carriers, and between this carrier and the deck, tending to urge the carriers into disengagable contact with each other. Further provided is a push mechanism for acting on the carriers to shift their positions against the action of this biasing spring.

More specifically, the biasing spring just mentioned normally urges the carriers into positions where one pinch roller engages its associated shaft, with the other pinch roller then being out of engagement with its associated shaft. Operation of the push mechanism reveses this situation. An operative interconnection between the carriers results in movement of one carrier to place its pinch roller against its associated shaft causing simultaneous movement of the other carrier to shift its pinch roller out of engagement with its associated shaft.

As will become apparent from the description which now follows, this construction results in an extremely simple assembly which offers a high degree of reliability. Further, it will become apparent that the proposed construction can be manufactured and assembled at relatively low cost.

These and other features and advantages of the invention will become more fully apparent as the descriptive material below is read in conjunction with the accompanying drawings.

DETAILED DESCRIPTION OF THE INVENTION

Figure 1:
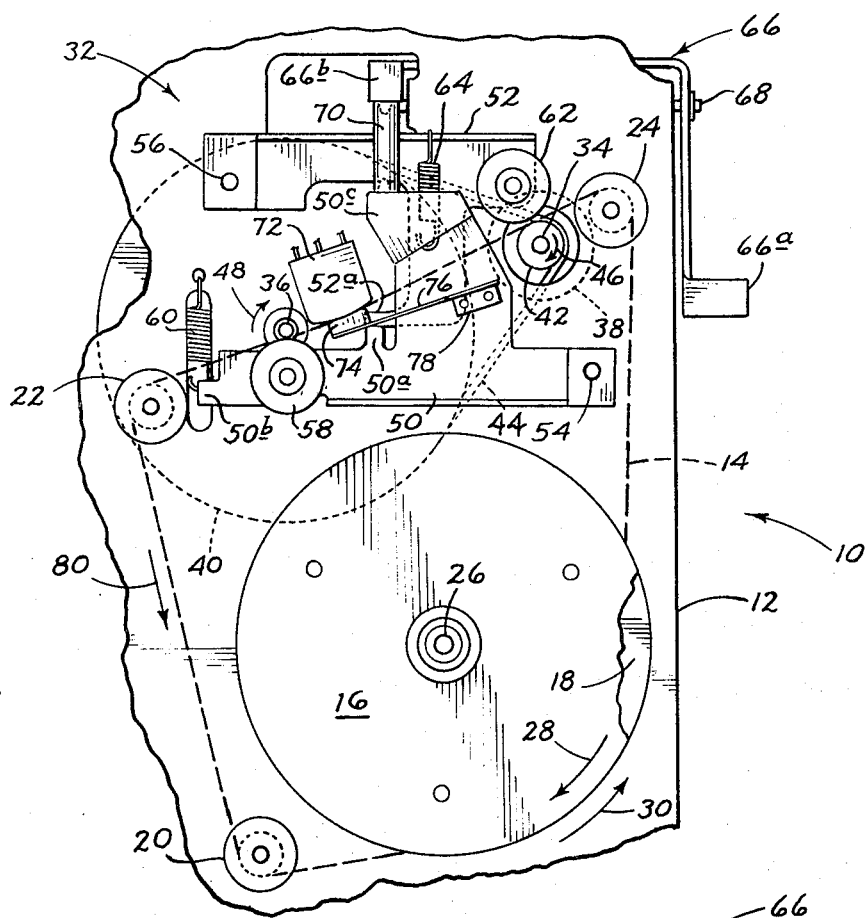
FIGS. 1 and 2 are fragmentary top plan views showing two different modifications of tape transports incorporating apparatus as contemplated by the invention.

Turning now to the drawings, and referring first to FIG. 1, indicated generally at 10 is a portion of a tape transport mounted on a deck 12, and forming part of a telephone answering device. The tape in the apparatus—a magnetic recording tape—is represented by dashed line 14 — this tape having its opposite ends collected as windings on a pair of coaxial, interbiased spools 16, 18. Between its ends, the tape is guided over three rollers, or guide means, 20, 22, 24, which are mounted on deck 12 for rotation about axes normal to the plane of FIG. 1. The take-up spool assembly 16, 18 forms no part of the present invention, and hence details of its construction are omitted. In general terms, however, these two spools are mounted for rotation on a spindle 26 which is suitably secured to deck 12, with a biasing agency, such as a clock spring (not shown), provided for acting between the spools. This spring is under tension, and tends to produce rotation of spool 16 in the direction of arrow 28 relative to spool 18, and rotation of spool 18 in the direction of arrow 30 relative to spool 16.

Tape 14 extends from spool 16 toward roller 24, and from roller 20 toward spool 18. It will be appreciated that the interbiased, coaxial spool assembly both tends to maintain tension in the reach of tape which extends between the spools, and accommodates relative rotation between the spools to account for differences in the diameters of windings of tape on the spools.

Disposed generally in the region between guide rollers 22, 24, and indicated by the reference character 32, is apparatus as contemplated therein mounted on deck 12 for reversibly driving tape 14. Included in this apparatus are two rotary shafts 34, 36 -- shaft 34 being the output shaft of an electric motor 38 which is mounted on and beneath deck 12, and shaft 36 being centrally secured to a pulley 40, also mounted on and beneath deck 12. The axes of rotation of shafts 34, 36 are normal to the plane of FIG. 1, both of these shafts projecting upwardly (toward the viewer) through suitable accommodating openings provided in the deck. A suitable rotary mounting is, of course, provided on the deck for pulley 40 and shaft 36. Mounted on shaft 34 beneath the deck is a pulley 42 from which drive is imparted to pully 40 through a belt 44. With operation of motor 38, shafts 34, 36 turn in the direction of arrows 46, 48. Because of the connection provided between pulleys 40, 42 by belt 44, under circumstances of the motor operating, it will be noted that shaft 36 turns in the same rotary direction as shaft 34. Rotational speed of shaft 36 is, however, considerably lower than that of shaft 34.

Indicated at 50, 52 in FIG. 1, are two carriers, as contemplated herein which are pivoted on deck 12 by means of pivot connections 54, 56, respectively. These two pivot connections accommodate swinging of the carriers about axes normal to the plane of FIG. 1.

In general terms, carrier 50 is formed of stamped and bent sheet metal, and is provided for carrying a rubber-tired pinch roller 58. Carrier 50 includes a projection 50a the purpose for which will be explained shortly, as well as a projection 50b by means of which the carrier is connected to the deck through a tension biasing spring 60. Spring 60 tends to urge clockwise rotation of carrier 50 about pivot connection 54, and in particular, tends to urge the carrier to a position pressing roller 58 against shaft 36. What might be thought of as the normal condition of the movable parts in FIG. 1 occurs with roller 58 pressing against shaft 36.

Carrier 52, although specifically different in shape from carrier 50, is also formed of stamped and bent sheet metal, and is provided, essentially, for carrying another rubber-tired pinch roller 62. A finger 52a in carrier 52 contacts previously mentioned projection 50a in carrier 50. Further, a tension biasing spring 64 interconnects carrier 52 and a wing 50c which forms part of carrier 50. With carrier 50 in the position shown for it in FIG. 1, engagement of projection of 50a and finger 52a causes carrier 52 to be held (upwardly in the figure) in the position shown for it in solid outline, with roller 62 disengaged from shaft 34.

It will be noted that the stretch of tape which extends between guide rollers 22, 24 extends on the lower side of shaft 36 in the figure and between this shaft and roller 58, and on the upper side of shaft 34 in the figure and between this shaft and roller 62.

Also included in apparatus 32 is a push mechanism, which consists herein of a crank, or lever, 66 pivoted at 68 on deck 12 for rocking about a substantially horizontal axis (in the plane of FIG. 1). An outer paddle 66a in the lever accommodates manual working of the lever, and an inner paddle 66b couples through a floating tube 70 with the top side of wing 50c in the figure. Tube 70 is held in place by means of suitable confronting projections (shown in dashed lines) provided on paddle 66b and wing 50c.

Completing a description of what is shown in FIG. 1, suitably mounted on top of deck 12, just to the right in the figure of shaft 36, is a conventional recording-/erase/playback head 72. Disposed opposite this head is the usual pressure pad 74 carried on the usual spring arm 76. Arm 76 is anchored through a mounting 78 on top of the lower portion of wing 50c in carrier 50. Tape 14 extends between head 72 and pad 74.

With the parts in the positions shown for them in FIG. 1, and with motor 38 operating, a bite of tape 14 is pinched between shaft 36 and roller 58. As a consequence, tape is moved in what is referred to as a forward direction (used for recording or playing out a message), due to the action of shaft 36 and roller 58. This direction is illustrated by arrow 80. The speed at which the tape so moves is a conventional voicerecording speed of about 3¾ inches-per-second. Tape, during such movement, is paid out from spool 16, and taken up by spool 18.

When it is desired to reverse the tape for the purpose of reusing it, or in order to play out any messages which may have been recorded, paddle 66a in level 66 is manually depressed (i.e., pressed into the plane of FIG. 1), with the result that, through the action of paddle 66b and tube 70, carrier 50 is swung downwardly in the Figure, against the action of biasing spring 60. Such action, and through the further agency of tension within spring 64, results in carrier 52 being pulled downwardly in the figure to press roller 62 against shaft 34. As a consequence, tape is released where it passes between shaft 36 and roller 58, and is pinched where it passes between shaft 34 and roller 62. What then occurs is rapid reversing of the tape, with such now being paid out from spool 16 and taken up by spool 18.

Releasing of paddle 66a returns the parts to their illustrated positions, with the tape, if the motor is still running, then beginning to advance again in the forward direction.

Figure 2:
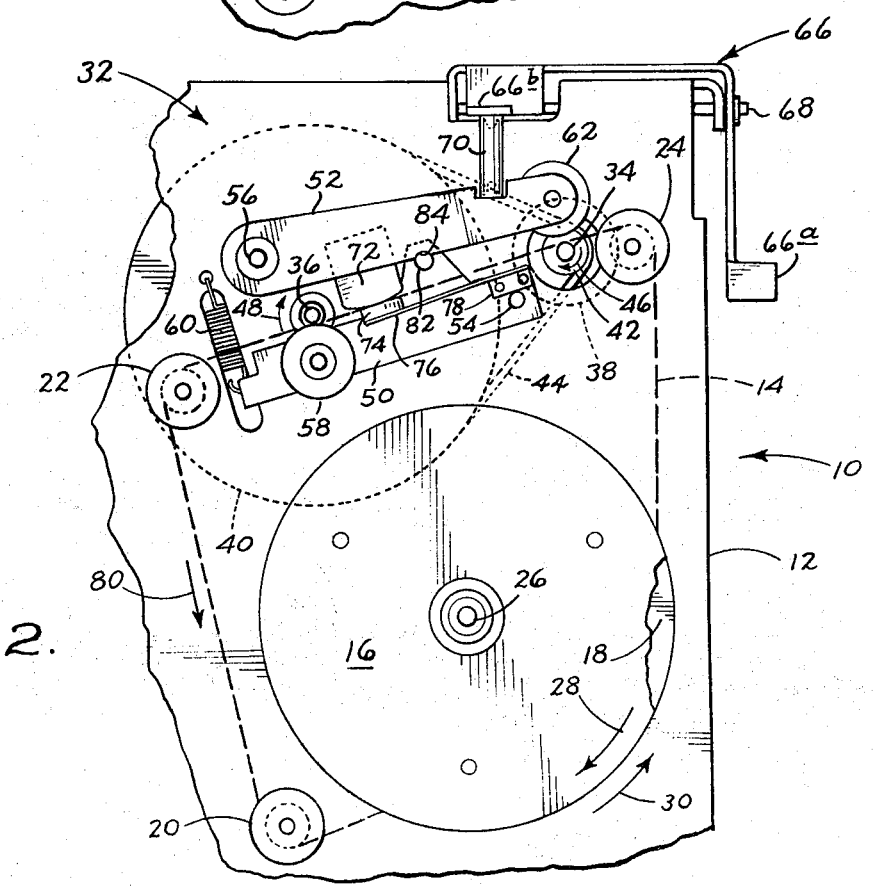

Referring now to FIG. 2, parts therein which are structurally, as well as functionally, like parts in the construction of FIG. 1 are given the same reference characters. The basic difference between the modification shown in FIG. 2 and that shown in FIG. 1, is that carriers 50, 52 are shaped somewhat differently, with engagement between the carriers occurring through a pin 82 on carrier 50 which fits in a notch 84 provided in carrier 52. A further difference is that the push mechanism acts directly on carrier 52 rather than on carrier 50. Thus, tube 70 acts between paddle 66b and the upper part of carrier 52 in FIG. 2. Also, there is no spring, like spring 64, acting between the carriers.

The various parts in the apparatus of FIG. 2 are shown in the positions which they normally occupy as a result of the influence or biasing spring 60. In this situation, tape is pinched between shaft 36 and roller 58, and is free in the space between shaft 34 and roller 62. With motor 38 operating, the tape is driven in a forward direction as indicated again by arrow 80.

When it is desired to reverse the tape, paddle 66a is depressed, which action results in downward rocking a carrier 52 to place roller 62 against shaft 34. Interaction between notch 84 and pin 82 causes simultaneous downward rocking of carrier 50 to shift roller 58 out of engagement with shaft 36.

Thus, the performance of apparatus as constructed according to FIG. 2 is basically the same as that constructed according to FIG. 1, except with respect to the specific way in which shifting of the positions of the carriers takes place. In the case of a FIG. 1-type construction, carrier 50 is pushed directly by the push mechanism, with carrier 52 pulled through the action of spring 64. In the case of FIG. 2-type apparatus, carrier 52 is pushed directly by the push mechanism, and itself directly pushes carrier 50.

It will be noted that in both of the modifications shown and described herein, relative movement can and does occur between the pinch rollers. More specifically, because there is no positive coupling between the carriers, it is possible, in special instances, to permit or cause movement of both carriers so as to shift both pinch rollers away from their respective associated shafts. This feature is considered to be a desirable one in a case where a mode of operation, other than driving of tape 14, might be desired, using either or both of shafts 34, 36. In other words, it might be desirable to have a mode of operation where tape 14 is not moving, but one or both of the shafts are used to cause driving of another tape.

Because there are many different configurations which may be used for the carriers herein, their specific constructions, as shown in the drawings, have not been discussed in full detail. Those skilled in the art will see readily how to form such carriers for use in different particular transport apparatuses.

From the descriptions which have just been given, it is believed to be apparent how the modifications of the proposed apparatus accomplish the objects, and have the advantages, set forth earlier.

While a preferred embodiment of the invention has been described herein, it should be apparent to those skilled in the art that variations and modifications are possible without departing from the spirit of the invention.

It is claimed as I desired to secure by Letters Patent:

1. Apparatus for selectively driving a magnetic tape, or the like, in reverse directions comprising
    a deck,
    a drive motor mounted on said deck,
    a pair of spaced-apart shafts mounted for rotation, and drivingly connected to said motor for simultaneous rotation in a common direction with operation of the motor,
    guide means for guiding a stretch of tape for travel adjacent and between said shafts,
    a pair of movable pinch rollers, one for each shaft, positioned adjacent the same for pinching tape against the shaft, said rollers being shiftable relative both to said shafts and to each other, and
    shifting mechanism operatively connected to said rollers, operable to shift said rollers to one condition where one engages one shaft, with the other then disengaged from the other shaft, and to another condition where said other roller engages said other shaft, with said one roller then disengaged from said one shaft,
    adjustment of said mechanism between said conditions causing relative movement between said rollers, as well as between said rollers and said shafts,
    said shifting mechanism including a pivoted carrier for each pinch roller pivoted on said deck with said carriers normally disengagably touching each other, and a biasing spring operatively interconnecting said deck and one of said carriers, said biasing spring urging said one carrier toward the other carrier, and thereby urging said shifting mechanism toward its said one condition.

2. The apparatus of claim 1, wherein said shifting mechanism further includes another biasing spring acting under tension between said carriers.

3. The apparatus of claim 2, wherein said shifting mechanism further includes a push mechanism acting on said one carrier, and between said one carrier and said deck, operable to push directly against said one carrier against the action of said first-mentioned biasing spring, thereby to place the shifting mechanism in its said other condition.

4. The apparatus of claim 1, wherein said shifting mechanism further includes a push mechanism acting on said other carrier and between said other carrier and said deck, operable to push directly against said other carrier, and through said other carrier to push said one carrier against the action of said biasing spring, thereby to place the shifting mechanism in its said other condition.

5. Apparatus for selectively driving a magnetic tape, or the like, in reverse directions comprising
    a first rotary shaft, and a first pinch roller movable toward and away therefrom, for driving a stretch of such a tape extending therebetween in one direction,
    a second rotary shaft, and a second pinch roller movable toward and away therefrom, for driving a stretch of such a tape extending therebetween in the opposite direction, said second shaft and roller being spaced from but adjacent said first shaft and roller,
    first and second independently movable carriers mounting said first and second pinch rollers, respectively, for movement thereof into and out of engagement with said first and second shafts, respectively, and
    means normally producing separable engagement between said carriers whereby movement of said first carrier to place said first pinch roller in engagement with said first shaft causes related movement of said second carrier to shift said second pinch roller away from said second shaft, and vice versa.

6. The apparatus of claim 5 which further comprises a single drive motor drivingly connected to said first and second shafts for driving them simultaneously in a common direction.

7. The apparatus of claim 5 which is mounted on a deck, and which further comprises a biasing spring operatively interconnecting said deck and said first carrier for urging said first carrier toward said second carrier, thereby to urge said first pinch roller into engagement with said first shaft, and said second pinch roller out of engagement with said second shaft.

8. The apparatus of claim 7 which further includes another biasing spring acting under tension between said carriers.

9. The apparatus of claim 8 which further includes a push mechanism acting on said first carrier, and between the said first carrier and said deck, operable to push directly on said first carrier against the action of said first-mentioned biasing spring, thereby to place said second pinch roller in engagement with said second shaft, and said first pinch roller out of engagement with said first shaft.

10. The apparatus of claim 7 which further includes a push mechanism acting on said second carrier, and between said second carrier and said deck, operable to push directly against said second carrier, and through said second carrier to push said first carrier against the action of said biasing spring, thereby to place said second pinch roller in engagement with said second shaft, and said first pinch roller out of engagement with said first shaft.

* * * * *